United States Patent [19]

Afeyan et al.

[11] Patent Number: 5,389,449
[45] Date of Patent: Feb. 14, 1995

[54] SULFONAMIDE BONDED HYDROPHILIC COATINGS

[75] Inventors: Noubar B. Afeyan, Brookline; Hossein K. Hodjat, Jamaica Plain; Laszlo Varady, Malden, all of Mass.

[73] Assignee: PerSeptive Biosystems, Inc., Cambridge, Mass.

[21] Appl. No.: 467

[22] Filed: Jan. 5, 1993

Related U.S. Application Data

[63] Continuation-in-part of Ser. No. 637,482, Jan. 4, 1991, abandoned.

[51] Int. Cl.$^6$ .................. B01D 15/08; B05D 3/10; C08F 8/32; C08F 8/38
[52] U.S. Cl. ................... 428/523; 210/198.2; 210/500.34; 210/500.38; 210/500.41; 210/502.1; 210/635; 210/656; 428/403; 428/407; 428/521; 502/402; 521/31; 521/32; 521/33
[58] Field of Search ............ 428/403, 407, 517, 521, 428/523; 521/31, 32, 33; 210/198.2, 500.34, 500.38, 500.41, 502.1, 635, 656; 502/402

[56] References Cited

U.S. PATENT DOCUMENTS

| | | | |
|---|---|---|---|
| 4,217,421 | 8/1980 | Beasley | 521/32 |
| 4,221,871 | 9/1980 | Meitzner et al. | 521/29 |
| 4,224,415 | 9/1980 | Meitzner et al. | 521/38 |
| 4,245,005 | 1/1981 | Regnier et al. | 428/420 |
| 4,256,840 | 3/1981 | Meitzner et al. | 521/33 |
| 4,297,220 | 10/1981 | Meitzner et al. | 210/690 |
| 4,382,124 | 5/1983 | Meitzner et al. | 521/38 |
| 4,501,826 | 2/1985 | Meitzner et al. | 521/29 |

FOREIGN PATENT DOCUMENTS

| | | |
|---|---|---|
| 0143423A3 | 6/1985 | European Pat. Off. |
| 0166015A1 | 1/1986 | European Pat. Off. |
| 2401190 | 3/1979 | France |

OTHER PUBLICATIONS

Chang, "Silica-Bound Polyethyleneglycol As Stationary Phase For Separation Of Proteins By High-Performance Liquid Chromatography", J. of Chromatography, 319:396-399 (1985).
Kopaciewicz, "Stationary Phase Contributions To Retention In High-Performance Anion-Exchanger Protein Chromatography: Ligand Density And Mixed Mode Effects", J. of Chromatography, 318:157-172 (1985).
Rounds, "Poly(styrene-Divinylbenzen)-Based Strong Anion-Exchange Packing Material For High-Performance Liquid Chromatography Of Proteins", J. of Chromatography, 397:25-38 (1987).
Rounds, "Synthesis Of a Non-Porous Polystyrene-Based Strong Anion-Exchange Packing Material And Its Application To Fast High-Performance Liquid Chromatography Of Proteins", J. of Chromatography, vol. 73-83 (1988).
Rounds, "Factors Contributing to Intrinsic Loading Capacity in Silica-Based Packing Materials for Preparative Anion-Exchange Protein Chromatography", J. of Chromatography, 362:187-196 (1986).

Primary Examiner—D. S. Nakarani
Attorney, Agent, or Firm—Testa, Hurwitz & Thibeault

[57] ABSTRACT

A method of derivatizing a chromatography matrix having a hydrophobic surface involves reacting the hydrophobic surface with a halosulfonating agent to produce a significant amount of halosulfone groups covalently bonded onto the surface. Sulfonamide bonds then are formed between these halosulfone groups and a group of amine functions on a polyaminated polymer to produce a pellicular anion exchange layer covalently bonded to the surface. The resulting layer is stable in the absence of cross-links between the molecules of the polyaminated polymer.

13 Claims, 4 Drawing Sheets

SULFONAMIDE BONDED HYDROPHILIC COATINGS

RELATED APPLICATIONS

This application is a continuation-in-part of U.S. patent application Ser. No. 07/637,482, filed Jan. 4, 1991, now abandoned, for "Sulfonamide Bonded Hydrophilic Coatings" by N. B. Afeyan et al., the entire disclosure of which is incorporated herein by reference.

BACKGROUND OF THE INVENTION

This invention relates to the production of hydrophilic coatings on hydrophobic surfaces. Specifically, this invention relates to a process for derivatizing a hydrophobic surface with a hydrophilic layer. The resulting material is useful as a chromatography medium for protein separation and as a protein compatible surface.

Support materials for high productivity liquid chromatography must be chemically and mechanically stable. Rigid inert polymers such as crosslinked polystyrene permit increases in operating pressure and flow rates. Hydrophobic interactions between such resins and proteins often are so strong that the proteins are denatured upon adsorption or during elution. Thus, it is recognized that one must post-treat the hydrophobic surface of such polymeric chromatography-packing materials to adapt them for use in the separation of proteins.

It is often necessary to force liquid through chromatographic column beds because the liquid mobile phase flows too slowly under the normal force of gravity to produce acceptable separation times. The problem of flow rate is aggravated by the use of microparticulate packing geometries often used to enhance resolution. It is common in liquid chromatography, i.e., high pressure liquid chromatography or HPLC, to use pressures of 100 atmospheres or more to achieve rapid separations. Soft-gel packing materials cannot tolerate more than a few atmospheres of pressure, thus are unsuited for high pressure use. As a result, these soft-gel packing materials increasingly are being replaced with rigid materials.

It is at least theoretically possible to react hydrophilic moieties with sites on hydrophobic polymers to provide a hydrophilic surface character. Such post-coated materials, often referred to as pellicular materials or supports, can be produced readily if the base polymer is one having many easily derivatized reactive groups. One example of this approach involves alkylation of styrene, followed by polymerization to produce derivatized polystyrene, and subsequent surface reaction with polyoxyethylene.

Another example is the derivatization of polymethacrylate. The basic hydrophobic character of this polymer may be altered if highly hydrophilic groups are introduced onto the surface through esterification. Such hydrophilic groups typically comprise hydroxyl and/or ether groups, and include such materials as glycerol, ethylene glycol, diethylamino ethanol, trimethyl ethanolamino glycolic acid, and hydroxyethylsulfonic acid. Unfortunately, exposure of such materials to extremes of pH, often required for regeneration of a chromatography medium, has the effect of hydrolyzing the ester linkages and of degrading the properties of the medium.

A paradox exists where the surface of rigid, inert, hydrophobic material has groups reactive enough to permit such derivatization, since that property generally is inconsistent with a major reason for turning to such support materials in the first place, i.e., inertness. However, the art has developed strategies to provide coatings on truly inert polymeric materials without requiring formation of covalent bonds directly between the coating and the support.

An example of alteration of the surface characteristics of a hydrophobic support medium involves adsorbing a water soluble surfactant onto a silica-based reverse-phase packing material (see, Change et al., J. Chrom., Vol. 319, pp. 369-399, 1985). The resulting surfactants have long hydrophobic tails and bulky hydrophilic heads. Once the tails are adsorbed to the support, the hydrophilic beads cover the hydrophobic surface so a protein cannot bind. Small molecules can penetrate into the hydrophobic region due to the presence of gaps between the hydrophilic beads, and the adsorbed coating is stable only in polar solvents. Further, the surfactants can leach from the sorbent surface, and highly hydrophobic proteins can displace surfactant molecules, thereby degrading the support.

U.S. Pat. No. 4,245,005 describes a method for producing a pellicular polyethyleneimine-coated, porous support. Charged polymeric molecules are attracted to the surface of support materials of opposite charge by means of electrostatic fortes. Once adsorbed, the polymeric materials are cross-linked in place and therefore resist erosion by solvent extraction, changes in pH, or exposure to elution buffers. This technique works well for the production of cationic resins (exchange anions), but is impractical for the preparation of organic, non-charge carrying chromatographic packing materials useful in other types of chromatography procedures.

Thus, there remains a need for a chromatography matrix having a hydrophilic pellicular coated surface for high protein ion exchange capacity, and stability in an HPLC environment.

SUMMARY OF THE INVENTION

This invention provides a method of derivatizing a chromatography matrix having a hydrophobic surface. The technique involves reacting the hydrophobic surface with a sufficient amount of a halosulfonating agent under conditions to selectively produce halosulfone groups ($SO_2X$, where X is a halogen atom) covalently bonded onto the surface. Sulfonamide bonds then are formed between these halosulfone groups and a group of amine functions on a polyaminated polymer to produce a pellicular anion exchange layer which is covalently bonded to the surface. The resulting layer is stable in the absence of cross-links between the molecules of the polyaminated polymer.

The method may be used for hydrophobic surfaces on polymers comprising aromatic groups and residual vinyl, such as styrene-divinylbenzene polymers, e.g., poly(styrene-divinylbenzene). The halosulfonating agent may be chlorosulfonic acid, which is reacted with the hydrophobic surface under conditions sufficient to selectively yield a chlorosulfone-functional matrix. Polyethyleneimine is reacted with the chlorosulfone functional groups to produce sulfonamide linkages which are stable in the absence of cross-linking of the polyaminated polymer. In a preferred embodiment of the present method, the sulfonamide bonds are formed by refluxing the halosulfone-derivatized substrate with polyethyleneimine.

After producing the covalently bonded pellicular anion exchange layer, the polyaminated polymer optionally may be crosslinked by exposing the layer to a cross-linking agent such as ethylene glycol diglycidyl ether (EDGE). The nitrogen nuclei of the resulting layer also may be quaternized if desired by exposing the layer to alkyl iodide.

The invention further provides a polyaminated chromatography material comprising a rigid, hydrophobic, aromatic, high surface area polymeric substrate having on the surface thereof an adherent, hydrophilic pellicular coating. The coating comprises a polyaminated polymer covalently attached to the substrate by sulfonamide bonds. The coating is stable in the absence of cross-linking between molecules of the polyaminated polymer, however, the polymer may be cross-linked if desired. The substrate preferably is poly(styrene-divinylbenzene), and the polyaminated polymer preferably is polyethyleneimine.

These and other features of the invention will be apparent from the following description and drawings.

BRIEF DESCRIPTION OF THE DRAWINGS

The accompanying drawings illustrate the invention and its achieved results according to the best modes so far devised for the practical application of the principles of the invention.

DETAILED DESCRIPTION OF THE INVENTION

Figure 1:
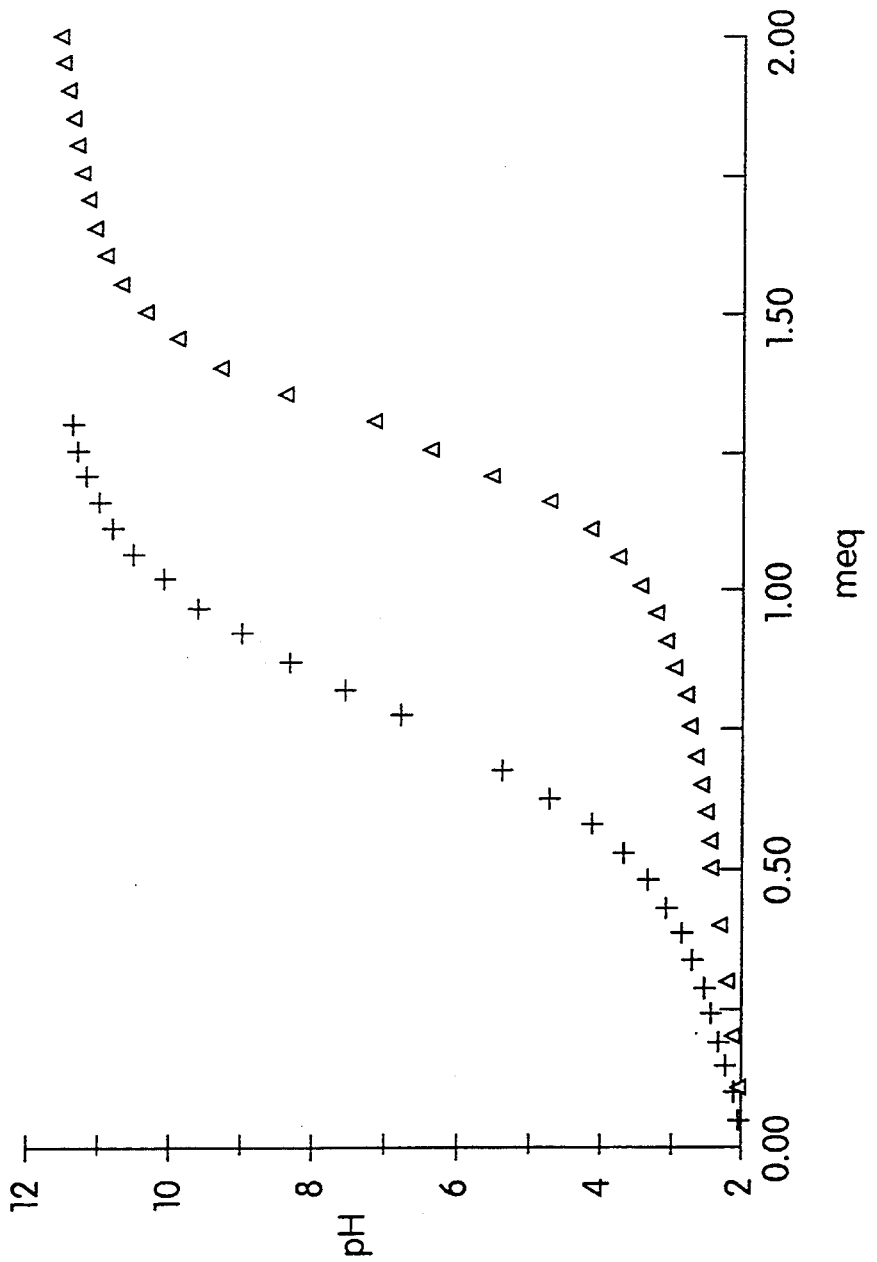
FIG. 1 is a graph illustrating the ionic capacity ($\mu$moles/ml) of the hydrophilic coating of the invention as measured by sodium hydroxide (NaOH) titration from pH 2.0 in a 1M sodium chloride (NaCl) solution, wherein "+" represents a reference coating, and "$\Delta$" represents the coated resin provided according to Example 1.
Figure 2:
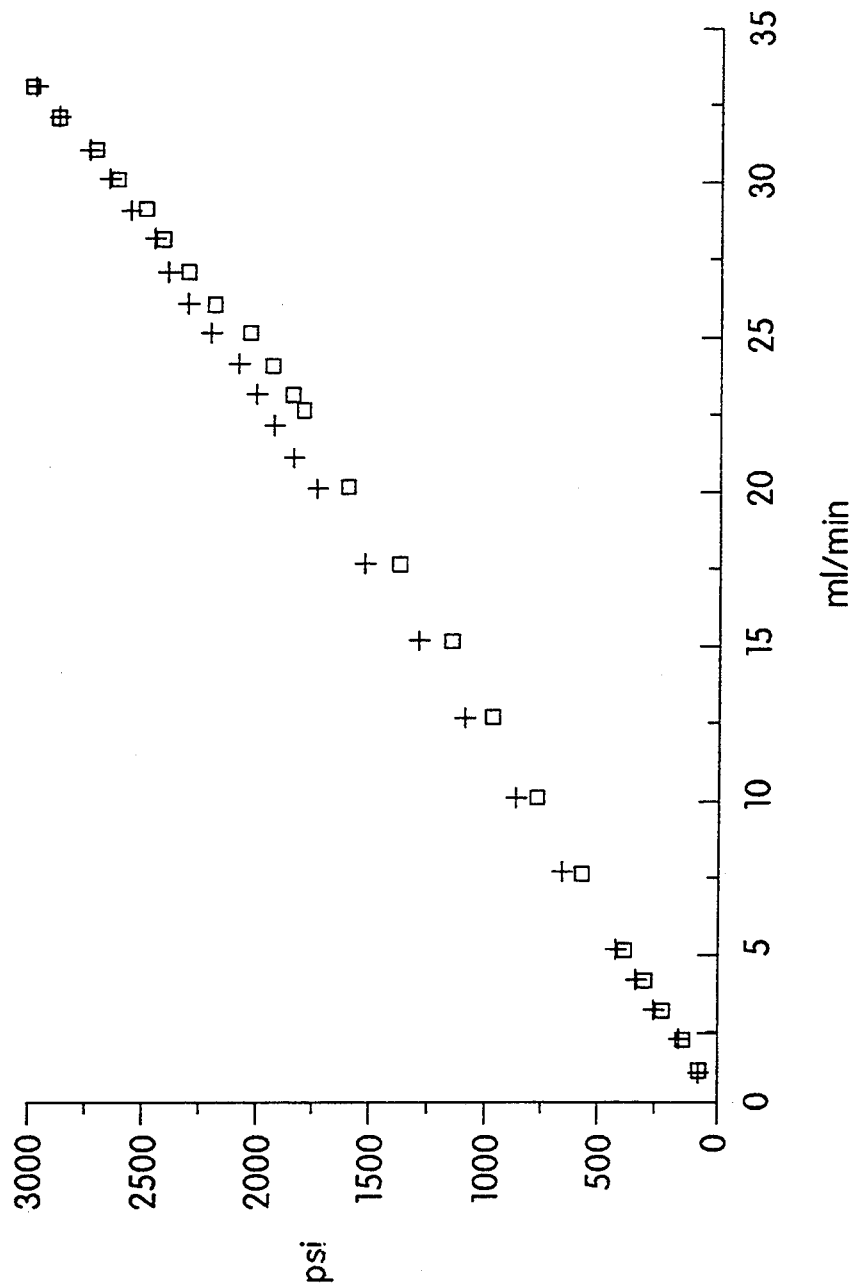
FIG. 2 is a graph showing the bed stability of the coating of the invention, as measured by flowing a 1% acetonitrile solution through a 4.6×100 mm column, wherein "+" represents the reference coating and "$\Delta$" represents the coated resin produced according to Example 1.
Figure 3:
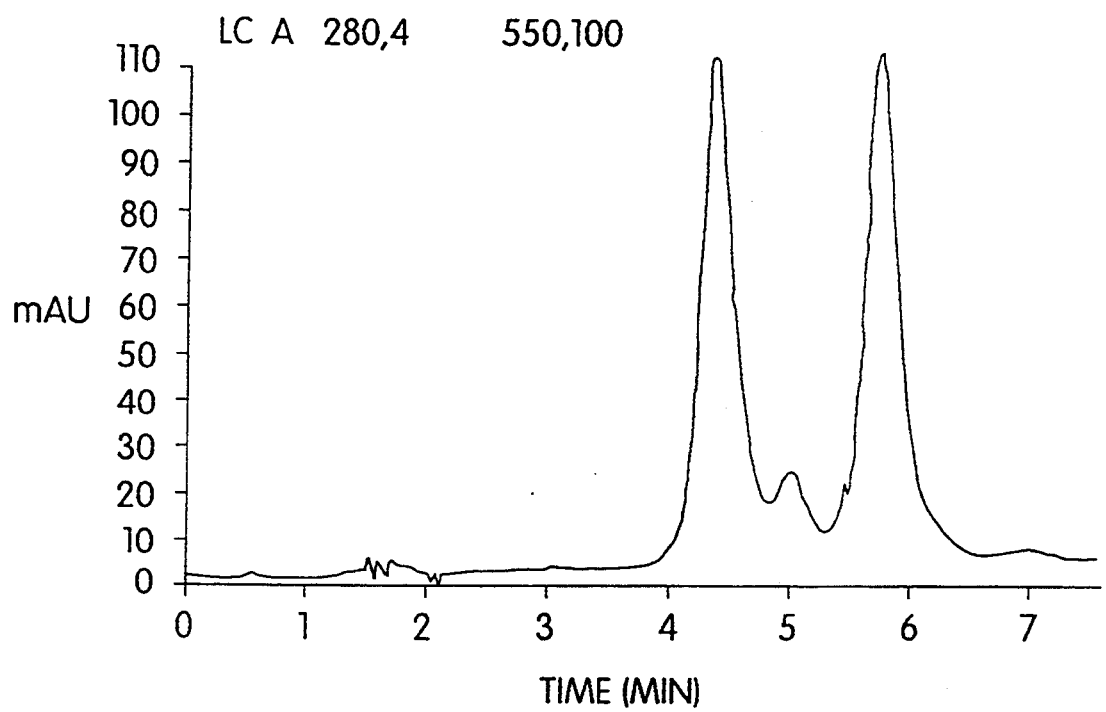
FIG. 3 shows the chromatographic separation of a mixture of 6 mg/ml OVA and 4 mg/ml Transferrin by a 10 ml gradient to 0.5M NaCl in 20 mM Tris-HCl buffer at pH=8, in a 4.6×100 mm column with a flow rate of 1 ml/min, using the coated resin produced according to Example 1.
Figure 4:
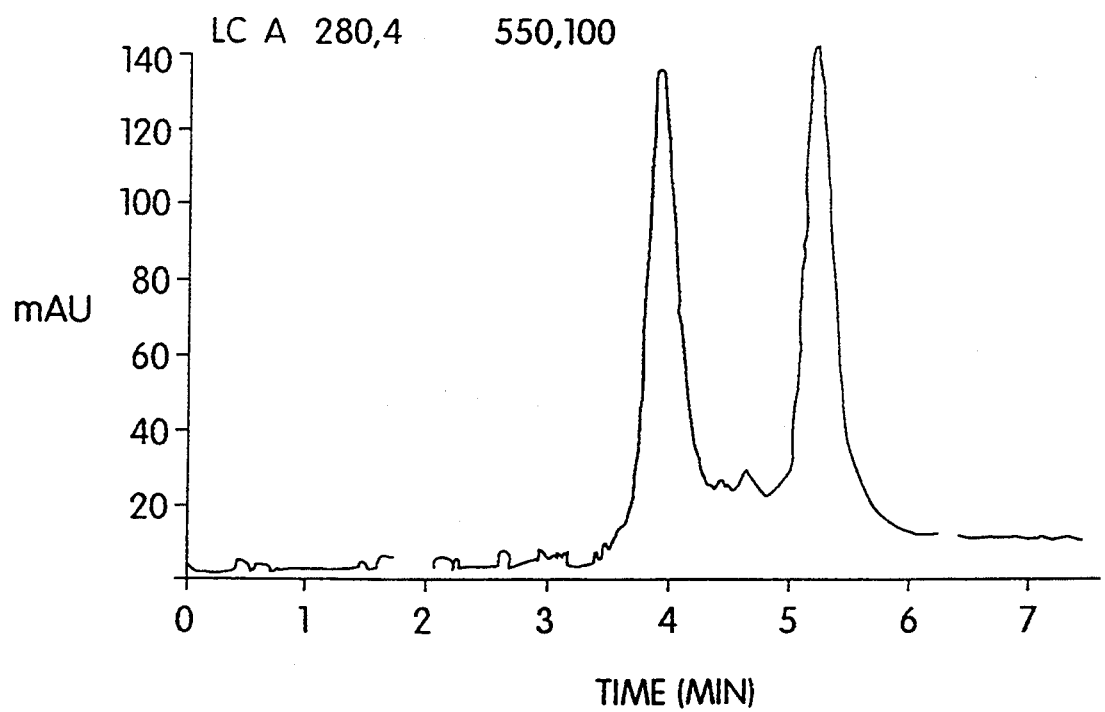
FIG. 4 Shows the chromatographic separation of a mixture of 6 mg/ml OVA and 4 mg/ml Transferrin by a 10 ml gradient to 0.5M NaCl in 20 mM Tris-HCl buffer at pH-8 in a 4.6×100 mm column with a flow rate of 1 ml/min, using a reference coating.
Figure 5A:
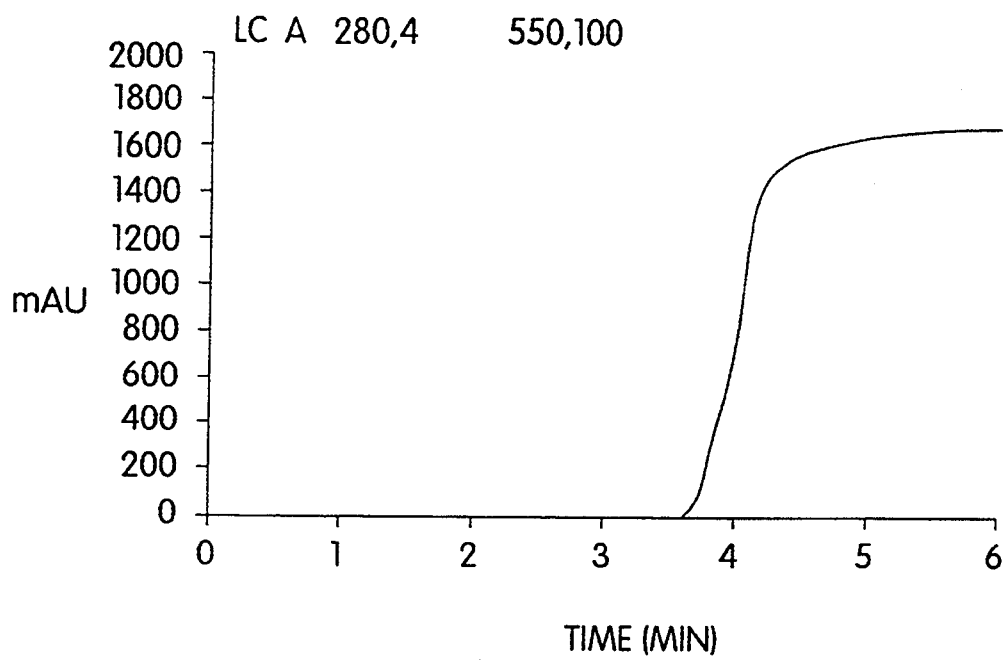
FIG. 5A shows the protein capacity of a coated resin produced according to Example 10, as measured with 2mg/ml BSA at 0.2 ml/min on a 2.1×30 mm column using Tris-HCl buffer at pH=8, showing a capacity of 39.5 mg/ml.
Figure 5B:
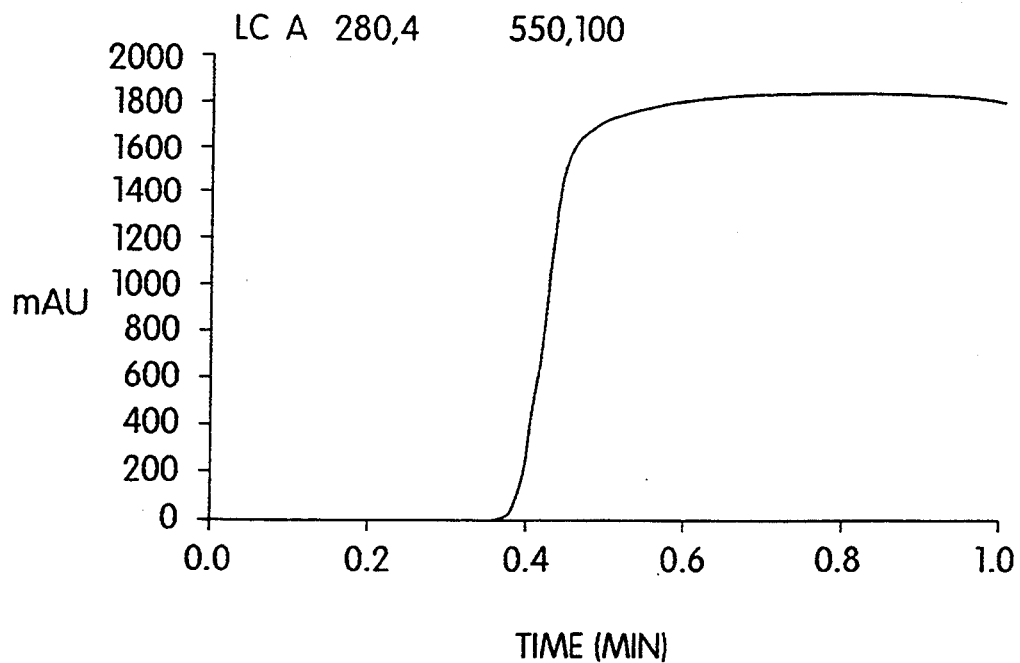
FIG. 5B shows the protein capacity of a coated resin produced according to Example 10, as measured with 2 mg/ml BSA at 2.0 ml/min on a 2.1×30 mm column using Tris-HCl buffer at pH=8, showing a capacity of 40.38 mg/ml.

The invention provides a process for producing anion exchange sorbents having multiple positive charges on the surface, primarily for use as chromatography matrices. The process generally involves forming covalently bonded halosulfonic functions on a hydrophobic surface, by reacting halosulfonic acid with the surface under conditions sufficient to selectively produce halosulfone groups. The resulting halosulfone groups are reacted with amine functions of a polyaminated polymer, thereby producing stable sulfonamide linkages and a strong anion exchange-coated sorbent. The resulting chromatography material has an underlying support which is rigid, hydrophobic, aromatic, and, preferably, has a high surface area. This support is coated with an hydrophilic pellicular coating which is both stable in the absence of cross-linking, and resistive to erosion.

The Substrate Materials

The invention may be practiced using essentially any hydrophobic substrate material, either organic or inorganic. Relatively inert hydrophobic polymeric materials are preferred. Rigid, cross-linked, high surface area particulate polymeric substrates are most preferred. The process of the invention may be used to coat such substrate materials irrespective of their geometry. Thus, it may be used to line the surface of pipes and containers, coat all accessible surface areas of a membrane, or coat all surfaces of microparticulate porous polymeric materials. The process is particularly well-suited for coating materials for use in high pressure liquid chromatography (HPLC), due to the resistance to erosion demonstrated by these materials during such a procedure.

The currently preferred substrate for materials for use in chromatography applications is polystyrene, preferably copolymerized with a polyvinyl comonomer, such as divinyl benzene (DVB), which provides crosslinking sites on the surface of the substrate. PSDVB materials which are most preferred for use in the present invention comprise at least about 20% by weight DVB, and most preferably about 50-100% (w/w) DVB based on styrene. Other crosslinking monomers known to the polymer chemist may be used in lieu of or in addition to DVB. Furthermore, other types of resins may be used including polyethers, polysulfones, polyamides, polyimides, poly(aryleneoxide), polyurethanes, polycarbonates, polyesters, poly(vinyl halides), poly(vinylidene halides), poly-acrylates, polyolefins, derivatives, blends, copolymers, or multipolymers thereof.

Generally, best results are achieved with high surface area particles, e.g., those made by fusion of smaller particles produced by known emulsion or suspension polymerization techniques. Preferred specific PSDVB substrate materials are available from PL Laboratories, Ltd., of Shropshire, United Kingdom. Particles can be made using the procedures disclosed in the Mertzner et al. U.S. Pat. Nos. 4,501,826, 4,382,124, 4,297,220, 4,256,840, 4,221,871, and 4,224,415, the disclosure of which are incorporated herein by reference. Also, perfusive matrix material of the type disclosed in copending application Ser. Nos. 07/376,885 and PCT U.S. 90/00930 may be coated. The disclosures of these applications are incorporated herein by reference.

Halosulfonating Agent

The first production step includes reacting the hydrophobic surface of the substrate material with a halosulfonating agent to create a reactive site on the hydrophobic polymer.

In the preferred embodiment, as discussed in detail below, the halosulfonating agent is chlorosulfonic acid ($ClSO_3H$). In this embodiment chlorosulfonic acid is contacted with the substrate under conditions which selectively produce chlorosulfone groups (—$SO_2Cl$) on the surface of the PSDVB substrate for subsequent bonding. These chlorosulfone functions then are reacted with a polyaminated polymer to produce covalent sulfonamide linkages on the substrate surface between the chlorosulfone groups of the substrate and the polymer. In this instance, the sulfone group is attached to the phenyl ring of the polystyrene, with a concomitant release of one mole of hydrochloric acid.

The halosulfonation reaction is performed under conditions which selectively produce halosulfone groups ($SO_2X$) and minimize formation of sulfonic acid ($SO_3^-$) groups. Sulfonic acid groups are undesirable since they do not react with PEI (or other polyaminated polymer) to form sulfonamide bonds. The reaction conditions necessary to induce selective formation of halosulfone groups include a temperature >4° C. and an excess of chlorosulfonic acid with respect to the substrate. The reaction is run in aprotic solvents, preferably methylene chloride, at a temperature ranging from 4° C. to the boiling point of the lowest boiling reactant. Most preferably, the temperature is ambient temperature, e.g., about 18°–25° C. The amount of halosulfonic acid preferably is in the range of from about 1.0 to about 200 millimoles (mmoles) per gram of substrate, most preferably between about 5 mmoles to about 100 mmoles per gram. When sulfonation is complete, the amount of covalent halosulfone groups produced under these conditions is at least 50% and is in most instances greater than 90%. Less than 10% sulfonate groups are formed under these conditions.

The presence of alkali metal salts such as sodium sulfate, sodium chloride or sodium phosphate, enhances the yield of the halosulfonated derivatives. The concentration of alkali metal salt which is effective for this purpose is from about 5 mmoles to about 100 mmoles.

In a preferred embodiment of the present method, the halosulfonated material formed after this step is washed with water or an organic solvent, such as, for example, acetone, methanol or dichloromethane.

Other halosulfonating agents may be used in lieu of or in addition to chlorosulfonic acid. Halosulfonating agents which can react with various substrates to produce halosulfone groups on the substrate surface which are reactive with a polyaminated polymer can be used. For example, the halosulfonating agent may include fluorosulfonic acid ($HSO_3F$).

Generation of Sulfonamide Bonds

Following halosulfonation of the substrate, the halosulfone groups formed on the substrate are reacted with a polyaminated polymer, i.e., a polymer comprising at least two reactive amine groups. In a preferred embodiment, the polymer is polyethyleneimine (PEI). PEI is commercially available at various molecular weights, for example, from Polysciences, Inc., Warrington, Pa. Polyethyleneimine polymers which are particularly preferred are polymers having an average molecular weight in the range of about 600 to 1,000,000 daltons. Other polyaminated polymers which are useful in the present invention include polyacrylamide, polyvinylpyrrolidone, amine-functional polypeptides, and aminosugars.

The reaction can be run in protic or aprotic solvents, preferably in water in the presence of an amine between 20° C. and 100° C. to allow the sulfonamide bond to form. The amount of polyaminated polymer used is in the range of from about 10% to about 300%, preferably between about 50% and 100% (w/w) based on chlorosulfonated polystyrene.

The reaction between the halosulfone functions of the substrate and the amine functions of the polymer produces sulfonamide bonds between the substrate and the polyaminated polymer. The polyaminated polymer binds to the sulfone groups at multiple points, depending upon the number of amine functions on the polymer molecule. This multipoint binding results in formation of a hydrophilic layer having substituted amine sites on the surface that can be subsequently quaternized or derivatized. The hydrophilic layer is attached through covalent sulfonamide bonds to the substrate, resulting in a stable pellicular layer which does not require further crosslinking. The resulting material can be used as an anion exchange resin which is stable under most chromatography conditions used for separating biomolecules, particularly proteins.

Cross Linking

The sulfonamide-bonded materials produced by the present process optionally may be cross-linked. It is an important aspect of the invention that the sulfonamide-bonded hydrophilic surface is stable without subsequent cross-linking. The covalent bonds formed between the underlying substrate and the hydrophilic polymer layer are sufficient for the material to be used as a chromatography matrix without the subsequent step of cross-linking the polyaminated polymer layer which forms the surface. However, reinforcement of the coating on the surface, if desired, may be achieved by introducing a cross-linking agent.

In the preferred embodiment, as shown below, the cross-linker is ethylene glycol diglycidyl ether. However, other commercially available cross-linking agents which may be used, include mono- and polyfunctional epoxides, such as 1,4-butanediol diglycidyl ether, triglylcidylglycerol, 1,2-epoxypropane, and 1,2-epoxy-3-isopropoxypropane.

Cross-linking is realized by the reaction of the epoxides of the crosslinker with the amine functions of the coated PEI. The glycidol groups may be introduced in the form of various commercially available resins containing, inter alia, triglycidols, diglycidols, or mixtures of di- and triglycidol. One such resin is LX-112 (1,3-diglycidylglycerol and triglycidylglycerol), available from Ladd Research Industries, Inc., P.O. Box 1005, Burlington, Vt. The resins may be introduced as a cross-linking agent.

Generally the crosslinking step is conducted using chemical reactions and processing techniques known to those skilled in the art to produce true covalent bonds between adjacent molecules. Details of crosslinking reactions necessarily depend on the nature and selection of the species.

Derivatization

Optionally, the pellicular coating of the invention may be derivatized to produce various types of chromatography media useful in size exclusions. Examples of types of derivatization which may be performed are described in further detail in U.S. patent application Ser No. 469,956.

The invention will be further illustrated from the following non-limiting examples.

EXEMPLIFICATION

EXAMPLE 1

This coating process is based on the use of poly(styrene-divinylbenzene), PSDVB, POROS ® R/M available from PerSeptive Biosystems,.Inc., 38 Sidney Street, Cambridge, Mass., and chlorosulfonic acid. Three grams of PSDVB was suspended in 20 ml dichloromethane ($CH_2Cl_2$), stirred for 10 minutes, then evacuated for 2 minutes. Another 10 ml dichloromethane was added and, while stirring at room temperature (about 20°–22° C.), 2 ml (0.3 mole) chlorosulfonic acid ($ClSO_3H$) was added. Samples were taken after 1, 3, and 5 hours. Each sample was then washed with a series of dichlormethane, and acetone ($CH_3COCH_3$), then dried under vacuum.

Microanalysis shows the chlorosulfonation to be complete after an hour, with no change after five hours of stirring. The resulting percentage breakdown after chlorosulfonation is as follows:

| | |
|---|---|
| Sample 1: 2.76% Cl | 8.87% S |
| Sample 2: 2.80% Cl | 8.99% S |
| Sample 3: 2.88% Cl | 8.97% S |

These samples (1.41 g) were refluxed at about 67° C. with 1.5 g PEI-600 in tetrahydrofuran for 2 hours, then filtered, washed with methanol and acetone, and dried.

Part of the resulting dried sample (0.45 g) was shaken with 0.45 g Ladd LX-112 resin in 5 ml methanol at room temperature for 12 hours. Finally, this sample (Sample 4) was quaternized, resulting in a protein capacity of 24 mg/ml, as evaluated at a flow of 0.2 ml/min., 2 mg/ml bovine serum albumin (BSA) on a 2.1 ×30 mm column.

Sample 5 consisted of shaking 0.45 g of the dried sample with 0.45 g of cross-linking agent ethylene glycol diglycidyl ether (EDGE) at room temperature. This sample was then quaternized, resulting in a protein capacity of 20.8 mg/ml, as measured using the evaluation method described above. The quaternization consists of refluxing equal amounts of coated beads with methyliodide and 25% 1,2,2,6,6-pentamethylpiperidine in methanol.

Sample 6 consisted of heating 0.45 g of dried sample mixed with 0.45 g of Ladd LX-112 resin in 5 ml methanol, while shaking, for 2 hours. This Sample 6 was also quaternized. The protein capacity is 21.9 mg/ml as measured using the same technique described above with respect to Sample 4.

EXAMPLE 2

This coating process is also based on the use of poly(styrene-divinylbenzene), PSDVB, and chlorosulfonic acid. Three grams of PSDVB was suspended-in 20 ml dichloromethane ($CH_2Cl_2$), stirred for 10 minutes, then evacuated for 2 minutes. Another 10 ml dichloromethane was added and, while stirring, 2.0 ml (0.3 mole) chlorosulfonic acid ($ClSO_3H$) was added at room temperature. After 5 hours of stirring, the mixture was treated with 2.0 g of PEI-600 in 10 ml dichloromethane, and suspended in 30 ml methanol. The suspension was filtered, and the precipitate washed with a series of dichloromethane, methanol, and acetone, then vacuum dried.

A suspension was made of 2.77 g dried sample in 30 ml methanol and 3.0 g Ladd LX-112 resin. This resin is a diglycidyl and triglycidyl glycerol mixture, which binds to primary and secondary amine sites. The mixture was evacuated briefly and shaken at room temperature for 12 hours. A sample was removed from the mixture, filtered, and the precipitate washed with the series: methanol; 0.1M potassium hydroxide (KOH); water ($H_2O$); and methanol. The washed precipitate was then vacuum dried.

This dried sample was next suspended in 30 ml methanol, 0.7 ml 1,2,2,6,6-pentamethylpiperidine and 2.0 ml iodomethane ($CH_3I$), then refluxed for four hours. Half of the sample was washed with a series of methanol, 0.1M KOH, and methanol, then vacuum dried. The other half of the sample was refluxed overnight. The protein capacity of both samples was the same, at 21 mg/ml of BSA, as measured above in Example 1.

EXAMPLE 3

This coating process involved suspension of 6.0 g PSDVB in 60 ml dichloromethane. After stirring for 10 minutes, the sample was evacuated for two minutes, then 4.0 ml 0.06 M chlorosulfonic acid ($ClSO_3H$) was added at room temperature. After 1.5 hours of mixing, sample 1 was removed, filtered, and the precipitate washed with dichloromethane and acetone.

Sample 1 was then refluxed for two hours at 67° C. in 40 ml THF and 2.0 g PEI-1800. This sample was filtered, washed with a series of methanol and acetone, then dried. A suspension was made of 2.0 g of the dried, coated resin and 2.0 g LX-112 in 20 ml methanol, and shaken overnight. The suspension was then heated 50°–60° C. for 15 minutes, filtered, and washed with a series of methanol, 0.1M KOH, $H_2O$, methanol. The resulting washed precipitate was then taken into 30 ml methanol, 0.7 ml 1,2,2,6,6-pentamethylpiperidine and 2 ml iodomethane and refluxed for three to four hours. The resulting solution was filtered and washed with a series of methanol, 0.1M KOH, $H_2O$, methanol, acetone, then dried. The protein capacity of the resulting resin was 16.7 mg/ml, as measured by the method described in Example 1 above.

Sample 2 was taken at the same point as Sample 1, yet it was divided into four portions, each of which was treated in the following manner. All four portions of Sample 2 were treated with 4.0 g PEI-1800 in 30 ml dichloromethane, and suspended in 30 ml methanol. Sample 2A was mixed with 2.0 g Ladd LX-112 in 20 ml methanol at room temperature and shaken overnight. Sample 2B was mixed with 2.0 g Ladd LX-112 resin in 20 ml methanol at 50°–60° C. for 2 hours. Sample 2C was mixed with 2.0 g EDGE in 20 ml methanol at 50°–60° C. overnight. All three of these samples were quaternized as described in Example 1 above, and tested for protein capacity. The resulting protein capacity for these three samples was 23 mg/ml, 25 mg/ml, and 25 mg/ml respectively.

Finally, 1.13 g of the fourth portion was taken into 10 ml methanol, with 1.20 g PEI-1800 and shaken overnight at room temperature. The resulting solution is heated to 50°–60° for 15 minutes, then filtered but not washed. The precipitate was washed with a series of methanol, 0.1M KOH, water, methanol, then taken into 15 ml methanol, 0.5 ml 1,2,2,6,6-pentamethylpiperidine and 1.5 ml iodomethane and refluxed for four hours. The resulting precipitate was washed with a series of methanol, 0.1M KOH, methanol, acetone. The resulting protein capacity was 22.3 mg/ml as measured using the technique of Example 1.

EXAMPLE 4

In the processes of this example, different cross-linking agents were tested by suspending 6.0 g PSDVB (1000A) in 60 ml dichloromethane stirring for 10 minutes. The sample was evacuated for 2 minutes, followed by the addition of 6.0 ml chlorosulfonic acid ($ClSO_3H$) while stirring. After two hours, 8.0 g PEI-1800 in 30 ml dichloromethane was added, followed by 30 ml methanol. The suspension was stirred for 1.5 hours, then filtered, and the precipitate washed with methanol. At that point, the sample was divided into four portions to be cross-linked.

Sample 1 was taken into a solution of 3.0 g LX-112 resin in 20 ml methanol, then heated to 50°-60° C. for 2 hours. The solution was filtered, and the precipitate washed with a series of 0.1M KOH, water, methanol, acetone, methanol. The resulting sample was quaternized with 2.0 ml iodomethane and 0.5 ml 1,2,2,6,6-pentamethylpiperidine. The resulting protein capacity was 44.9, measured according to the technique of Example 1.

Sample 2 was treated the same as Sample 1, with an overnight cross-linking incubation time. The resulting sample was heated for 3-5 minutes at 50°-60° C. The protein capacity of this sample was 48 mg/ml after quaternization.

Sample 3 was treated the same as Sample 1, substituting 3.0 g EDGE for 3.0 g LX-112 resin as the cross-linking agent. The resulting protein capacity was 48.07 mg/ml after quaternization.

Sample 4 was treated the same as Sample 2, substituting 3.0 g EDGE for 3.0 g LX-112 resin as the cross-linking agent. The resulting protein capacity was 50.48 mg/ml after quaternization as described for sample 1.

EXAMPLE 5

In the processes of this example, different combinations of cross-linking agent and methanol washes were tested by suspending 5.8 g PSDVB (POROS R/M) in 60 ml dichloromethane, stirring for 1.5 hours. The suspension was then evacuated for 2 minutes, and 6.0 ml chlorosulfonic acid ($ClSO_3H$) was added to the sample while Stirring. After 2 hours of stirring, 12 g PEI-10000 (30%.in $H_2O$) was added. The suspension was stirred for an additional 1.5 hours, filtered and divided into two samples. Sample 1 was washed with methanol and incubated with cross-linking agent LX-112 for 48 hours, then quaternized as described above in Example 4. The protein capacity was 51.3 mg/ml.

Sample 2 was not washed with methanol, and was incubated 48 hours with the cross-linking agent EDGE, then quaternized as described above. The resulting protein capacity was 23.5 mg/ml. The resulting coated resin had high back pressure.

EXAMPLE 6

In this example, 3g PSDVB (POROS R/M), available from PerSeptive Biosystems, Inc., 38 Sidney Street, Cambridge, Mass., was suspended in 60 ml of dichloromethane. The suspension was stirred for one hour, then evacuated for 2 minutes. 15 ml of chlorosulfonic acid ($ClSO_3H$) was added while stirring. The suspension was then filtered and washed with water and methanol. The resulting beads were taken into 30 ml of water and 10 g of PEI 10000 (30% solution in $H_2O$), then stirred at 70°-80° C. for 8 hours. The resulting solution was filtered, then washed with a series of 0.1M KOH, water, and methanol, then dried. The resulting coated resin had a protein capacity of 29 mg/ml.

EXAMPLE 7

In this example, 5.0 g PSDVB (POROS R/M) was suspended in 60 ml dichloromethane. The sample was stirred for 20 minutes,, evacuated for 2 minutes, and 5 ml chlorosulfonic acid ($ClSO_3H$) was added while stirring. After 2 hours, 10 g PEI-10000 (30% solution in $H_2O$) was added. The suspension was stirred for 2 hours, filtered, and the precipitate washed with methanol. The suspension was then taken into 30 ml methanol and 5.0 g LX-112 resin, stirred overnight at 50°-60° C., filtered, and the precipitate washed in a series of 0.1M KOH, water, methanol. The back pressure was eliminated and the protein capacity was high, at 39.4 mg/ml. The suspension was next re-cross-linked with 3.0 g LX-112 resin, stirred overnight at 50°-60° C. filtered and the precipitate washed with a series of 0.1M KOH, water, methanol. The suspension was quaternized as described above in Example 4. The protein capacity resulting from this process was reduced to 14.4 mg/ml, however, the coating was stable.

EXAMPLE 8

In this series, 5.0 g PSDVB (POROS R/M) was suspended in 60 ml dichloromethane. The suspension was stirred for 20 minutes, evacuated for 2 minutes, then 5 ml chlorosulfonic acid ($ClSO_3H$) was added while stirring. After 4 hours, 5 g PEI-1800 in 10 ml dichloromethane was added, and stirred for 30 minutes while 10 ml methanol was added. The suspension was stirred for 2 hours, filtered, and the precipitate washed with methanol, then divided into three samples.

Sample 1 was suspended in 30 ml methanol along with 3 g LX-112 resin cross-linking agent, and shaken overnight. The suspension was heated for 30 minutes, with the addition of 1 g LX-112 resin. The suspension was shaken while heating for a period of time consistent with Samples.2 and 3. The sample was further divided into two samples. Sample 1A was quaternized in the presence of 1,2,2,6,6-pentamethylpiperidine, resulting in a protein capacity of 16.7 mg/ml. Sample 1B was quaternized without the addition of 1,2,2,6,6-pentamethylpiperidine, resulting in a protein capacity of 15.86 mg/ml.

Sample 2 was also suspended in 30 ml methanol along with 1 g LX-112 resin and 3 g PEI-1800. The sample was quaternized, and the resulting protein capacity was 22.21 mg/ml.

Sample 3 was suspended in 30 ml methanol having 1 g LX-112 and 3 g PEI-10000. The sample was quaternized and the resulting protein capacity was 26.69 mg/ml.

EXAMPLE 9

During the process of this Example, 20 g of PSDVB was suspended in 300 ml of dichloromethane. The mixture was stirred for one hour, and then evacuated for 2 minutes. While stirring, 100 ml of chlorosulfonic acid ($ClSO_3H$) was added, and the resulting mixture was filtered, washed with water, then taken into 70 ml of water and 70 g of 30% PEI 10000. The suspension was stirred at 70°-80° C. for 10 hours, then filtered and washed with a series of 0.1M KOH, water, and methanol, then dried. Protein capacity was 28 mg/ml as measured by the technique of Example 1.

EXAMPLE 10

In this example, 50 g PSDVB was suspended in 500 ml dichloromethane. The suspension was stirred for 30 minutes, evacuated for 2 minutes, with the addition of 50 ml chlorosulfonic acid ($ClSO_3H$) while stirring. After 2 hours, 93 g PEI-10000 was added to the suspension and stirred for an additional 2 hours. PEI was mixed with 100 ml dichloromethane, followed by 50 ml methanol. The mixture was filtered, and the precipitate washed with methanol. The dissolute was taken in 300 ml methanol, and 50 g LX-112 resin cross-linking agent was added, then stirred overnight at 50°–60° C. The solute was filtered, and the precipitate washed in a series of 0.1M KOH, water, methanol. The sample was taken into 200 ml methanol, 50 ml iodomethane, and 5 g 1,2,2,6,6-pentamethylpiperidine and refluxed for 4 hours. The sample was filtered, and the precipitate washed with a series of 0.1M KOH, water, methanol. The protein capacity of the resulting resin was 39 mg/ml.

In the examples given, the cross-linking was performed using two different cross-linking agents. It is possible, however, to cross-link the imine groups with other commercially available cross-linking agents.

Equivalents

From the foregoing description, those skilled in the art can easily ascertain the essential characteristics of this invention, and without departing from the spirit and scope thereof, can make various modifications of the invention which are equivalent thereto. Such equivalents are intended to be encompassed by the following claims.

We claim:

1. A method of preparing a chromatography matrix having an anion exchange layer covalently bonded to a surface of a hydrophobic organic polymer comprising the steps of:
   a. reacting said hydrophobic polymer at a temperature above 4° C. with a halosulfonating agent selected from the group consisting of chlorosulfonic acid and fluorosulfonic acid in a concentration of at least 10 mmol per gram of said polymer, thereby selectively forming halosulfone groups covalently bonded onto said polymer and minimizing formation of sulfonate groups;
   b. washing the halosulfonated polymer formed in step (a) with water or an organic solvent; and
   c. reacting said halosulfone groups with a polyaminated polymer having plural amine groups per molecule of said polymer to form sulfonamide bonds between said halosulfonated polymer and said plural amine groups of said polyaminated polymer thereby producing a non-cross-linked polymeric anion exchange layer covalently bonded to said hydrophobic polymer, said layer being stable in the absence of cross-links between the molecules of said polyaminated polymer.

2. The method of claim 1 wherein the quantity of halosulfonating agent is about 100 mmol per gram of hydrophobic polymer.

3. The method of claim 1 wherein said polyaminated polymer is polyethyleneimine.

4. The method of claim 1 wherein the reaction of step (c) is carried out by refluxing the halosulfonated polymer produced in step (b) with the polyaminated polymer.

5. The method of claim 1 wherein the reaction of step (a) is carried out at room temperature or above.

6. The method of claim 1 further comprising the step of cross-linking said polyaminated polymer after step (c) by exposing said polymer layer to ethylene glycol diglycidyl ether.

7. The method of claim 1 comprising the additional step of quanternizing nitrogen nuclei remaining after step (c) by exposing said polymer layer to an alkyl iodide.

8. The method of claim 1 wherein said hydrophobic surface comprises an aromatic polymer.

9. The method of claim 8 wherein said aromatic polymer is poly ( styrene-divinylbenzene).

10. The method of claim 9 wherein said poly(-styrenedivinylbenzene) is in the form of fused microparticles.

11. A chromatography material comprising a hydrophobic, aromatic, organic polymeric substrate having on the surface thereof, a non-crosslinked hydrophilic polymeric layer, said layer comprising a polyaminated polymer having plural amine groups per molecule of said polymer covalently attached to said substrate by sulfonamide bonds, said layer being stable in the absence of cross-links between the molecules of said polyaminated polymer.

12. The material of claim 11 wherein said substrate comprises poly( styrene divinylbenzene).

13. The material of claim 11 wherein said polyaminated polymer comprises polyethyleneimine.

* * * * *